P. J. MARKS.
MULTIPLE APERTURE SHUTTER.
APPLICATION FILED NOV. 23, 1915.

1,329,424.

Patented Feb. 3, 1920.

Inventor
Paul J. Marks

Witnesses

UNITED STATES PATENT OFFICE.

PAUL J. MARKS, OF ROCHESTER, NEW YORK, ASSIGNOR TO EASTMAN KODAK COMPANY, OF ROCHESTER, NEW YORK, A CORPORATION OF NEW YORK.

MULTIPLE-APERTURE SHUTTER.

1,329,424.  Specification of Letters Patent.  Patented Feb. 3, 1920.

Application filed November 23, 1915. Serial No. 62,945.

*To all whom it may concern:*

Be it known that I, PAUL J. MARKS, of Rochester, in the county of Monroe and State of New York, have invented certain new and useful Improvements in Multiple-Aperture Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters of a type in which a plurality of shutter mechanisms under the control of one actuating means are arranged to close a plurality of lens apertures, and it has for its object to provide a simple structure thereof which will permit of the lens apertures being placed very close together. A further object of the invention is to provide a simple and effective arrangement whereby the blade mechanisms are actuated in unison and one through the medium of another. To these and other ends the invention resides in certain improvements and combinations of parts all as will be hereinafter more fully described, the novel features being pointed out in the claims at the end of the specification.

In the drawings.

Similar reference numerals throughout the several figures indicate the same parts.

The shutter illustrated is one designed for the simultaneous taking of three exposures on three successive picture areas of a cinematograph film for the purposes of a three-color photographic process and wherein the problem of disposing three blade mechanisms in very close relationship arose.

Figure 1:
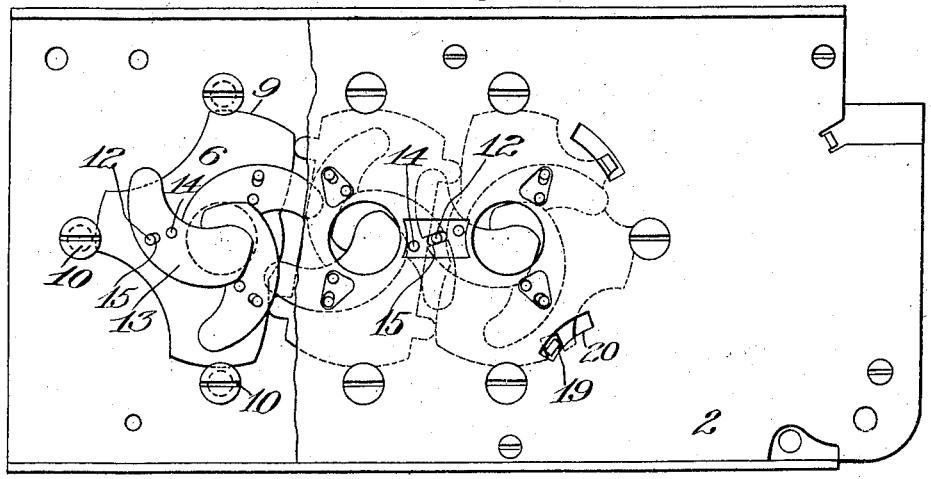
Figure 1 is a rear view of a shutter mechanism constructed in accordance with and illustrating one embodiment of my invention.
Figure 2:
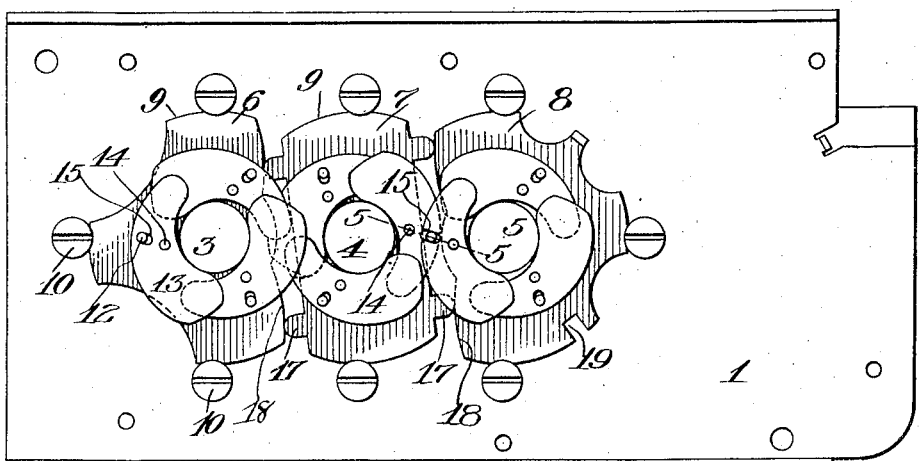
Fig. 2 is a similar view with the cover plate removed and the blade mechanisms in open position.
Figure 4:
Fig. 4 is a perspective view of one of the blades.
Figure 3:
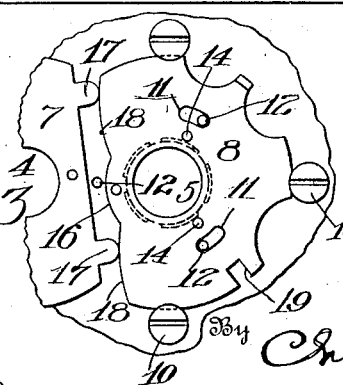
Fig. 3 is a fragmentary view of two of the blade actuating rings illustrating the manner in which they coöperate and with the blades removed.
Figure 5:
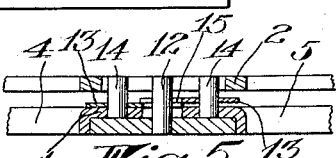
Fig. 5 is a detail section taken substantially on the line 5—5 of Fig. 2 with the cover plate in position.

Referring more particularly to the drawings, 1 indicates the mounting plate and 2 the cover plate of the shutter unit having the lens openings 3, 4 and 5 therein. Secured to the rear of the mounting plate are three blade actuating rings 6, 7 and 8 that rotate in two directions within limited arcs. They have their bearings at 9 on their peripheries, in the present instance, against screws 10 beneath the heads of which they are confined. Projecting through slots 11 (Fig. 3) in the actuating rings are pivots 12 fixed to the plate 1 and upon which turn the shutter blades 13. The blades of each group lie against the rear faces of the respective rings and each is pierced and pivotally engaged by a pin 14 on the latter. Thus, as the rings are rotated to the right, the blades are opened, and as they are rotated to the left, the blades are closed, the pivot openings 15 on the fixed pins 12 being, in the present instance, elongated to permit the two pivotal movements.

As shown more plainly with respect to the groups about the lens apertures 4 and 5, adjacent blades of the two blade mechanisms are mounted upon the same fixed pivot pin 12 so that the two blade mechanisms overlap and can be brought correspondingly close together.

In order to permit the force of one shutter operating mechanism (not shown) applied to one of the actuating rings 6, 7 and 8, to be communicated in like manner to the others for the joint corresponding actuation of the three groups of blade mechanisms, the central ring 7 is provided on each side with two engaging points 17 that contact, respectively, with cam surfaces 18 on the two rings 6 and 8 at points on opposite sides of the axes of the rings, that is, on opposite sides of a line drawn through their axes. In the present instance, any suitable shutter actuating mechanism is operatively connected to the ring 8 at 19 through a slot 20 in the cover plate 2. It will be seen that the rings are locked together for joint movement in both directions, the points 17 riding on their respective cam surfaces 18 at the top of the rings 6 and 8 (in the figures) to open, and at the bottom to close.

By this arrangement, the rings can also be placed very close together. In fact, their thickness at the point of tangency may be reduced to that of the pins 14 and the necessary distance between the latter and the fixed pivots 12 to obtain the required throw of the blades.

I claim as my invention:

1. In a multiple aperture shutter, the combination with a support and two blade mechanisms thereon each embodying a plurality of blades, of a fixed pivot on the support located between the mechanisms and upon which one blade of each mechanism turns, pivots for the other blades, a rotary actuating ring for each mechanism carried by the support, one of which rings carries a pivot engaging one of the blades having the common pivot on one side and the other of which rings carries a pivot engaging the other blade on the other side of the fixed pivot and means for rotatably supporting said rings.

2. In a multiple aperture shutter, the combination with a support and two blade mechanisms thereon, of an actuating ring for each having bearings on the support and provided with coöperating sliding bearing and driving members whereby one may be actuated through the medium of the other.

3. In a multiple aperture shutter, the combination with a support and two blade mechanisms thereon, of a rotatable actuating ring for each having bearings on the support and coöperating portions on the respective rings on each side of a line drawn through their two axes comprising an engaging point on one and a cam surface on the other whereby one ring may be operated through the medium of the other.

4. In a multiple aperture shutter, the combination with a support and two blade mechanisms thereon each embodying a plurality of blades and a rotatable actuating ring for each blade mechanism having bearings on the support of a fixed pivot located between the mechanisms and upon which one blade of each mechanism turns and pivots on the support for the other blades, said rings being provided with coöperating sliding contacts and cams, respectively, whereby one may be actuated through the medium of the other.

PAUL J. MARKS.

Witnesses:
RAYMOND A. WILSON,
EDITH WATERSTRAAT.